United States Patent [19]

Heyraud

[11] 4,060,746
[45] Nov. 29, 1977

[54] ELECTRIC DIRECT CURRENT ROTATING MACHINE

[75] Inventor: Marc Heyraud, Les Geneveye-sur-Coffrane, Switzerland

[73] Assignee: Portescap, La Chaux-de-Fonds, Switzerland

[21] Appl. No.: 610,861

[22] Filed: Sept. 5, 1975

[30] Foreign Application Priority Data

July 11, 1975 Switzerland .................. 9076/75

[51] Int. Cl.² .......................................... H02K 23/00
[52] U.S. Cl. ................................. 310/177; 310/266
[58] Field of Search ........ 310/203, 207, 198, 220–226, 310/177, 266, 159

[56] References Cited

U.S. PATENT DOCUMENTS

| | | |
|---|---|---|
| 2,952,788 | 9/1960 | Volkerling et al. ................. 310/266 |
| 3,191,081 | 6/1965 | Faulhaber ........................ 310/207 X |
| 3,209,187 | 9/1965 | Angele ................................ 310/266 |
| 3,733,506 | 5/1973 | Jaffe et al. ...................... 310/223 X |

Primary Examiner—Donovan F. Duggan
Attorney, Agent, or Firm—Arthur V. Smith

[57] ABSTRACT

The rotor of an electric direct current rotating machine has at least one winding which cooperates with a stationary magnetic circuit. The winding is formed of several sections connected in series. The respective opposite ends of each section are connected to adjacent segments of a commutator associated with the winding. The sections are arranged on the rotor in such a manner that portions of different adjacent sections are disposed concurrently in the commutation zone so that currents flow through these portions in opposite directions. The invention finds application in particular to direct current motors and to motor-generators.

11 Claims, 8 Drawing Figures

ELECTRIC DIRECT CURRENT ROTATING MACHINE

BACKGROUND OF THE INVENTION

The present invention relates to an electric machine and, more particularly, to a DC machine having a stationary magnetic circuit and a rotor, the rotor bearing a winding comprised of a plurality of sections which are electrically connected in series and, at the respective ends of the sections to consecutive segments of a commutator associated with the winding.

The invention finds particular application in respect of direct current motors, and to motor-generators having a single rotor.

In many types of conventional direct current motors, the voltage peaks induced upon commutation are among the leading causes for the wear and damage of the motor brushes and the commutator. In order to minimize these voltage peaks, the section of the winding which is short circuited during commutation must be located in the zone of minimum flux. When the current increases in the rotor, the position of the brushes with respect to the ideal position under load should be modified. This correction, however, generally is possible only in the case of a motor which rotates in a single direction of rotation under constant load.

In order to further reduce the effects of the induced voltage peaks, auxiliary circuits have been proposed, such as resistors provided in parallel with the winding coils. Such resistors may be voltage-dependent resistors (VDR) or be formed of semiconductor elements. Auxiliary circuits have the disadvantage of consuming current and decreasing the efficiency of the motor. Moreover, in most cases they considerably increase the cost of the motor.

In motor-generators having a single rotor, the arrangement of the motor and generator coils on the same rotor makes it possible to avoid shifts between different rotors, and thus avoids mechanical resonances which may otherwise occur upon strong acceleration and deceleration of the rotor. The single-rotor proposal, however, is accompanied by the problem of inductive coupling between the windings. In many typical motor generators, the corresponding sections of the motor winding and of the generator winding are superposed or juxtaposed on the rotor so that the current variations in the motor winding, particularly upon commutation, produce, by induction, parasitic currents and voltages in the generator winding. In machines in which the rotor contains iron, this effect may become even more disturbing than mechanical resonance. Even for those machines using an iron-less rotor, such as the so-called bell or disk-shaped rotor, for instance, inductive coupling constitutes a very substantial disadvantage.

OBJECTS OF THE INVENTION

Therefore, it is an object of the present invention to provide an improved machine which overcomes the aforenoted and other problems attending prior art machines.

Another object of the present invention is to provide a DC machine wherein wear and deterioration of the machine brushes and the commutator are effectively reduced by reason of a relatively simple arrangement.

A further object of this invention is to provide an improved machine whose winding is arranged in sections such that induced voltage peaks are minimized during commutation.

A still further object of this invention is to provide a motor-generator having motor coils and generator coils, and wherein parasitic currents due to inductive coupling therebetween are reduced.

Various other objects and advantages of the invention will become apparent from the ensuing detailed description, and the novel features will be particularly pointed out in the appended claims.

SUMMARY OF THE INVENTION

In accordance with this invention, an electric machine is provided with a winding having sections which are arranged on the rotor in such a manner that portions of different sections are disposed concurrently in the commutation zone and currents of opposite polarity flow therethrough; each section is formed of at least two coil elements connected in series and the sections are arranged so as to form at least two superposed layers on the rotor, whereby the arrangement of the series-connected coil elements and the position of the connecting points of the winding by which the sections are connected to the segments of the commutator are such that currents of opposite polarity flow through at least two superposed coil elements which are concurrently present in the commutation zone.

A coil element, as the expression is used herein, is to be understood as comprising a turn of the winding or several turns, as a portion or portions of a turn or turns, respectively, or, in general, as being formed of any conductive element or assembly of conductive elements participating, by interaction with the magnetic field produced by the stationary magnetic circuit, at the same moment and in the same manner in the creation of motor torque.

In one embodiment of a machine in accordance with the invention, a motor-generator is provided, having, on the same rotor, a motor winding and a generator winding which cooperate with the stationary magnetic circuit; the radial planes defining the boundaries of adjacent sections of the motor winding and of the generator winding being angularly spaced apart by an amount $\pi/N_s$, in which $N_s$ is the number of sections in each winding.

BRIEF DESCRIPTION OF THE DRAWINGS

The accompanying drawings show, by way of example, various embodiments of the windings of a machine in accordance with the invention. The present invention will best be understood by the following detailed description taken in conjunction with the drawings in which.

DETAILED DESCRIPTION OF CERTAIN PREFERRED EMBODIMENTS

In the motors shown in FIGS. 1A, 1B, 3 and 4, the commutator C of each motor is represented schematically as having nine segments 1 to 9, for example, which are connected by conductors (not shown) to respective connecting points of the winding B, these connecting points being designated by the same numbers 1 to 9, so as to facilitate a ready understanding of the present invention.

Figure 1A:
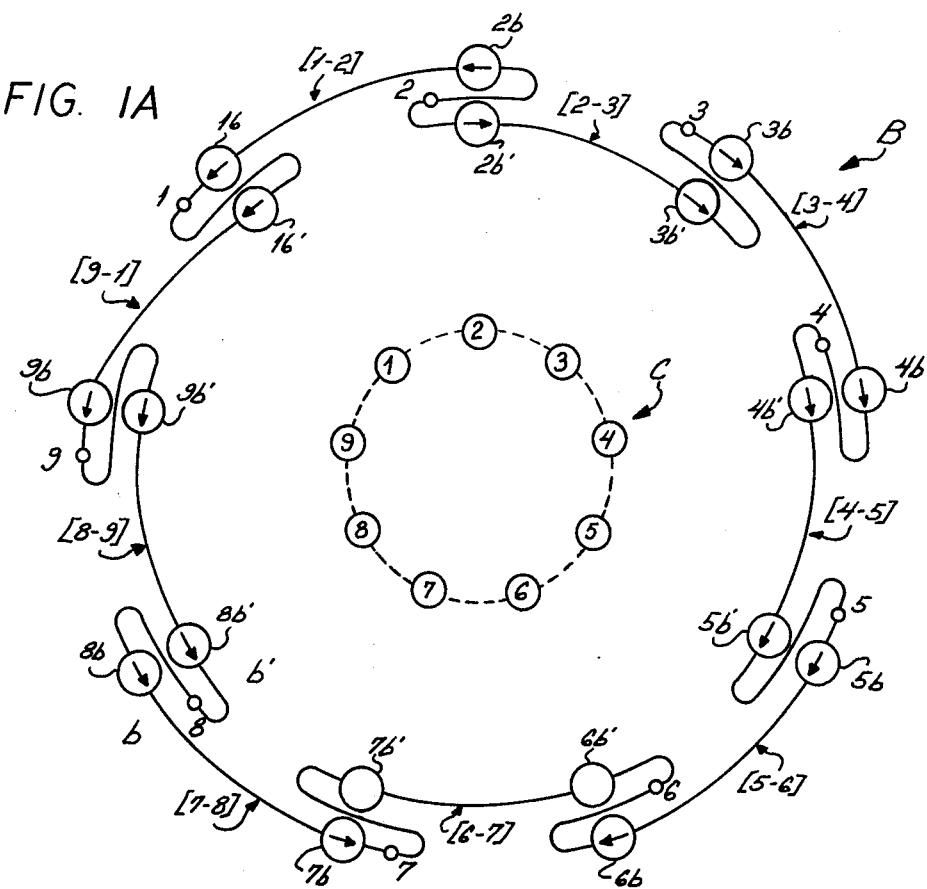
FIG. 1A shows schematically the arrangement of a double layer winding of a motor having nine commutator segments.
Figure 1B:
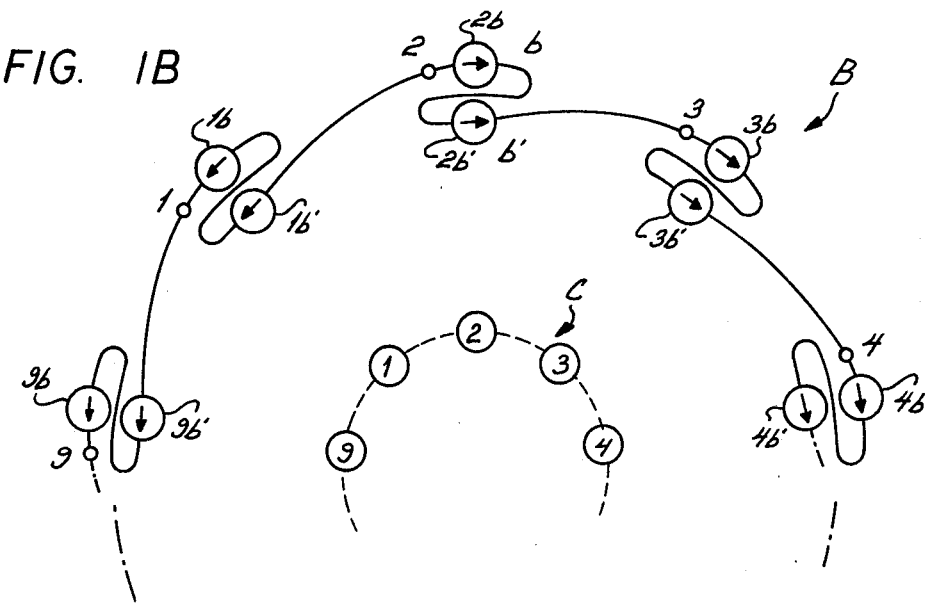
FIG. 1B shows schematically the arrangement of a double layer winding of a motor of known type.

In FIGS. 1A and 1B, the winding B is formed of a number of elementary coils $b$ and $b'$, shown schematically, which constitute the coil elements of the winding B. In the embodiment shown, these coils are arranged in two superposed layers of nine coils $1b, 2b, \ldots 9b$ and $1b', 2b', \ldots 9b'$, respectively. The winding B may, for instance, be a regular oblique winding, such as shown schematically in FIGS. 2A and 2B.

FIG. 1A is a schematic illustration of one embodiment of the present invention wherein the coils $1b$–$9b$ and $1b'$–$9b'$ are connected in series; while FIG. 1B, by way of comparison, is a schematic illustration of the customary connection of these coils. It will be noted that in the customary connection, the elementary coils which form a winding section are superimposed in the radial direction while in the arrangement shown in FIG. 1A, the elementary coils which form a winding section are spaced apart in the direction of the periphery of the rotor so that they cover a larger surface on the rotor. That is, let it be assumed that in both Figures, the winding B is provided with connecting points $1, 2, \ldots, 9$, respectively, each connecting point being connected to a corresponding segment $1, 2, \ldots, 9$, of the commutator C. Also, each section of the winding B is defined by the series-connected coils which extend between consecutive connecting points. Hence, in FIG. 1A, section [1-2] extends between the connecting points 1, 2 and is formed by the series-connected coils $1b$ and $2b$. Similarly, section [2-3] is formed by the series-connected coils $2b'$ and $3b'$. Further, the section [3-4] is formed by the series-connected coils $3b$ and $4b$. The remaining sections are formed in an analogous manner. It is recognized that, although the coils $2b$ and $2b'$ are superimposed so that both of these coils are concurrently present in the commutation zone, these coils are not included in the same section. That is, the coil $2b$ is included in the section [1-2], whereas the coil $2b'$ is included in the section [2-3]. Stated otherwise, the superposed coils ($1b, 1b'; 2b, 2b'; 3b, 3b' \ldots$) form respective portions of adjacent sections ([1-2], [2-3], $\ldots$) of the winding B, each section being constituted by spaced apart series-connected coils, and the sections are connected in series with each other. This improved winding shown in FIG. 1A is contrasted with the customary winding shown in FIG. 1B wherein the superposed windings ($1b, 1b'; 2b, 2b'; 3b, 3b' \ldots$) are included in the very same section. That is, section [1-2] of FIG. 1B is formed of superposed windings $1b$ and $1b'$. Section 8 [2-3] of FIG. 1B is formed of superposed windings $2b$ and $2b'$. The remaining sections are similarly constituted. Although the windings $1b'$ and $2b$ are connected in series and are spaced apart, they are not connected in the same section, as are the series-connected spaced apart windings of FIG. 1A.

It is seen that, in FIG. 1A, the points of a connection $1, 2, \ldots 9$ of the winding B to the respective segments of the commutator C are located between the elementary coils of each pair of superimposed coils $1b, 1b'; 2b, 2b'; \ldots 9b, 9b'$. As a result, and contrary to the location of the points of connection of FIG. 1B which are positioned between the spaced apart coils, when the commutator segment 2 is in contact with a brush (not shown) the current in FIG. 1A flows in opposite directions in the two superposed elementary coils $2b$ and $2b'$ which are located in the commutation zone. These coils therefore operate in opposition so that a compensation of the induced counter-electromotive force takes place. The other coils $3b, 3b', 3b 4b', \ldots$, on the other hand, operate in the same direction because current flows through these remaining superposed coils in the same direction. The direction of current flow in the respective coils is indicated by the arrows for the assumed condition that the commutator segments 2, 6 and 7 are contacted by the brushes.

Contrary to the compensation effects achieved in the FIG. 1A embodiment, when the commutator segment 2 of FIG. 1B is in contact with a brush, the current flows in the same direction in the superposed pair of coils $2b$ and $2b'$, as well as in the superposed pair of coils $1b$ and $1b'$. This is shown by the indicated arrows. Hence, the induced counter-electromotive force is not compensated in the FIG. 1B arrangement.

Figure 2A:
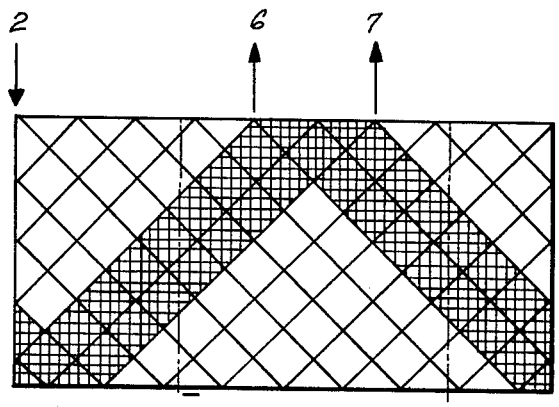
FIG. 2A shows schematically a developed view of the surface of the rotor formed of oblique windings as connected in accordance with FIG. 1A.
Figure 2B:
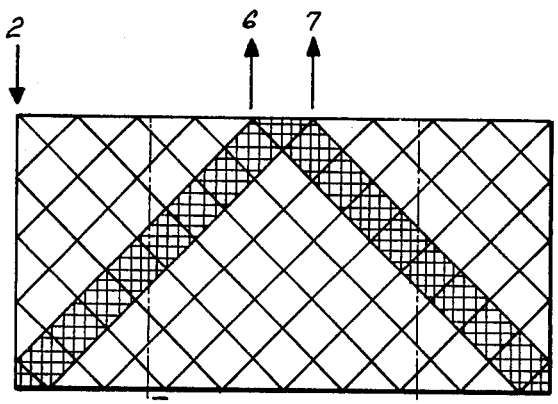
FIG. 2B shows schematically a developed view of the surface of a rotor formed of oblique windings as connected in accordance with FIG. 1B.

FIGS. 2A and 2B show schematically a developed view of the cylindrical surface of the rotor for the two arrangements shown in FIGS. 1A and 1B, respectively, for the assumed embodiment wherein the rotor is of a regular oblique winding. In such a winding, each elementary coil $b$ or $b'$ is represented by two oblique arms which intersect at an angle, the connection with the commutator taking place on one lateral side of the rotor. The arrows of FIGS. 2A and 2B indicate, for instance, the points of connection of the winding and the direction of the respective currents with respect to the three commutator segments which are in contact with the brushes upon commutation. Thus, current is seen to flow in parallel paths from the connection point 2 to the connection points 6 and 7, respectively. Moreover, the limits of the magnetic field produced by the stationary magnetic circuit are indicated in these figures by broken lines for the assumed position of the rotor wherein the commutator segments 2, 6 and 7 are in contact with the brushes. The hatched areas in each Figure show the zones short circuited upon commutation, which zones are defined by the two elementary coils forming the corresponding section. The Figures clearly show that the area of the short-circuited zone of the motor in accordance with this invention is substantially increased, and symmetrically, as compared with that of the known motor, due to the connection of side-by-side elementary coils in a single section in accordance with FIG. 1A, rather than the connection of superposed elementary coils in a single section as shown in FIG. 1B. This makes it possible to reduce the induced voltage peaks upon commutation without modifying the number of elementary coils which are short circuited. The ohmic resistance of the motor, its power, and the undulation of its torque as a function of the position of the rotor, also remain unchanged.

In accordance with an alternative embodiment of this invention, in the winding of FIG. 1A, the superposed coiled elements can, instead, be arranged side-by-side in the general axial direction of the rotor so that the two coils are on the surface of the rotor at substantially the same distance from the axis. Such a winding can be formed as by a bifilar winding, the points of connection of the commutator being located, as in FIG. 1A, at a common junction of two coil elements which are juxtaposed side-by-side, these elements belonging to adjacent sections of the winding.

Figure 3:
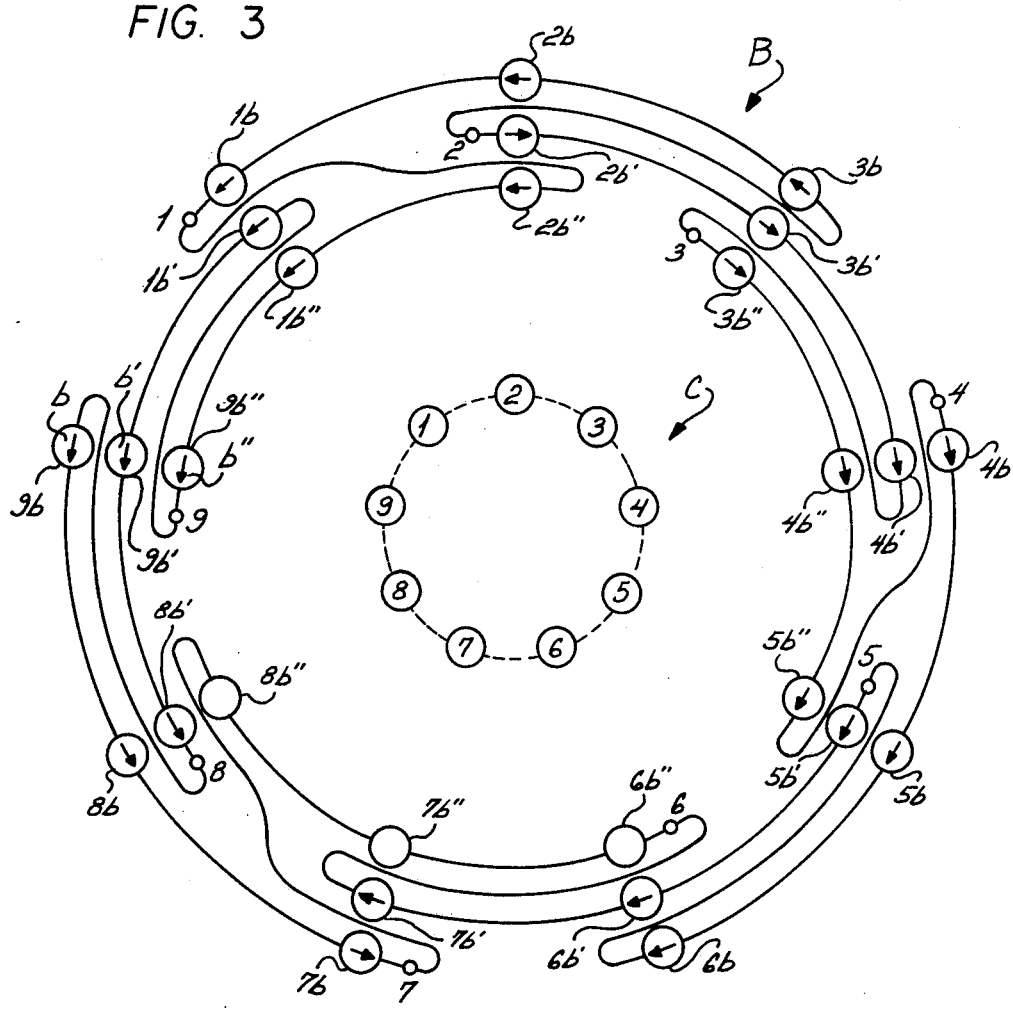
FIG. 3 shows schematically the arrangement of a triple-layer winding.
Figure 4:
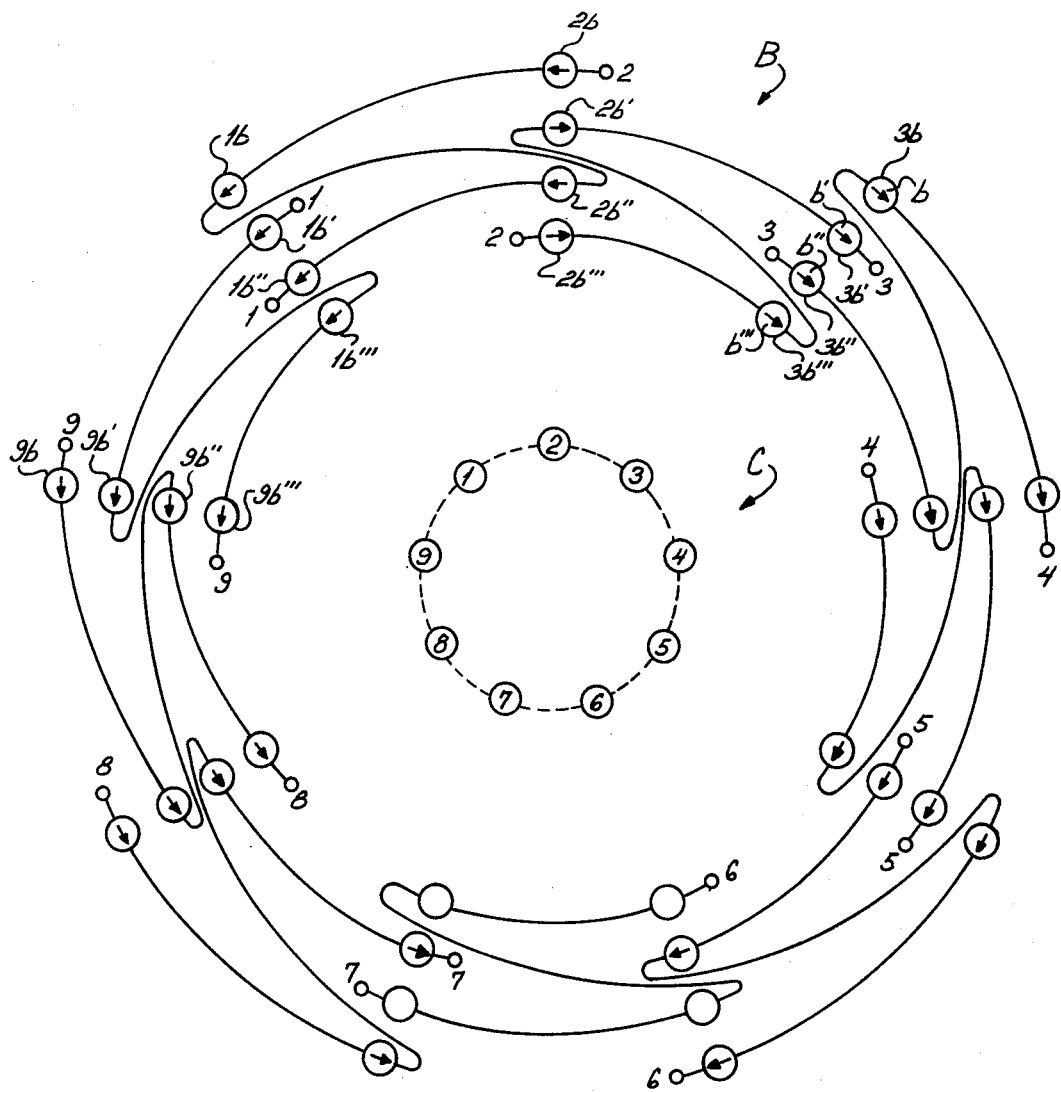
FIG. 4 shows schematically the arrangement of a quadruple-layer winding of a motor having nine commutator segments.

FIG. 3 illustrates an example of the connection of the elementary coils for an embodiment wherein the winding comprises three layers of coils $b$, $b'$ and $b''$, and FIG. 4 illustrates a further embodiment of four layers of coils $b$, $b'$, $b''$ and $b'''$. The elementary coils connected in series in each section are spaced apart in the peripheral direction of the rotor so as to cover a relatively large surface on the rotor. This is shown in FIG. 3 by the section formed of coils $1b$, $2b$ and $3b$. This section is connected in series with and partially superposes the section formed of coils $2b'$, $3b'$ and $4b'$, as well as the section formed of coils $2''$, $3b''$ and $9b''$. Hence, the coils $2b$, $2b'$ and $2b''$, all of different sections, are superposed. Also, the coils $3b$, $3b'$ and $3b''$ are of different sections and are superposed. Accordingly, it is seen that the superposed coils of FIG. 3 are included in adjacent sections.

With respect to the FIG. 4 embodiment, one section is formed of four series-connected coils, such as $1b''$, $2b''$, $1b$ and $2b$, which is interleaved with series-connected adjacent sections formed of the series-connected coils $9b'''$, $1b'''$, $9b'$ and $1b'$ and of the series-connected coils $2b'''$, $3b'''$, $2b'$ and $3b'$, respectively. Hence, with respect to the four superposed coils, for example $2b$, $2b'$, $2b''$ and $2b'''$, two of the coils $2b$ and $2b''$ are in one section and the remaining two coils $2b'$ and $2b'''$ are in an adjacent section. In FIG. 4, connecting points identified by the same reference numeral are understood to be connected together.

In the case of a rotor formed of a regular oblique winding, the peripheral distance encompassed by each section may thus be two times (FIG. 4) or three times (FIG. 3) larger than that encompassed by each section of, for example, the rotor shown in FIG. 1B. Furthermore, FIGS. 1A, 3 and 4 show that, depending upon the number of segments of the commutator and the number of layers of the winding, the elementary coils included in each of the sections may be disposed in the same layer or may be disposed in different layers of the winding. As shown in FIG. 3, the coil elements of the one section (e.g. elements $1b$, $2b$, and $3b$) are not superposed and adjacent sections partially overlap. In the embodiment shown in FIG. 4, each section has two pairs of superposed coils (e.g. coils $1b$, $1b''$ and $2b$, $2b''$), the superposed pairs being spaced apart in the peripheral direction of the rotor.

In accordance with a feature of the windings of this invention, the elementary coils are connected in series and the commutator-connecting points are located such that when at least one of superposed coils is in the commutation zone, currents flow through the superposed coils in opposite direction, as shown by the arrows in FIGS. 3 and 4. Thus, when the brush contacts commutator segment 2 so that the connecting point 2 is in the commutation zone, the section formed of coils $2b'$, $3b'$ and $4b'$ in FIG. 3 is in the commutation zone. This section is connected in series with two adjacent sections and, as indicated, currents flow through the superposed coils $2b$, $2b'$ and $2b''$ in alternately opposite directions; and currents flow through the superposed coils $3b$, $3b'$ and $3b''$ in opposite directions. In FIG. 4, the section formed of coils $2b$, $1b$, $2b''$ and $1b''$ is connected in series with the section formed of coils $2b'''$, $3b'''$, $2b'$ and $3b'$ and, as indicated, currents flow through the superposed coils $2b$, $2b'$, $2b''$ and $2b'''$ in alternately opposite directions.

Figure 5:
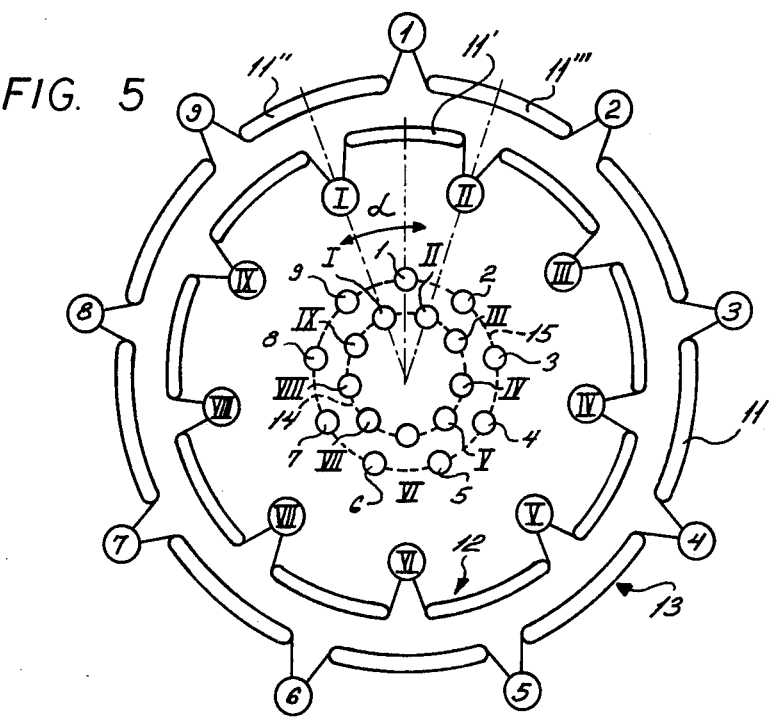
FIG. 5 is a diagram showing the principle of the arrangement of the windings on the rotor of a motor-generator.

In the illustration of FIG. 5, the sections of the windings of the rotor of a motor-generator are designated by the general reference 11. In accordance with the example shown, each of the two windings, the motor winding 12 and the generator winding 13, has $N_s=9$ sections, whose consecutive ends are connected to each other and to the segments I, II, III, IV, V, VI, VII, VIII, IX and 1, 2, 3, 4, 5, 6, 7, 8, 9, respectively, of the motor and generator commutators 14 and 15 indicated schematically. The actual, physical connections between the coils and commutators are not shown in FIG. 5, but the points of connection of the winding sections and the corresponding segments are designated by the same reference numerals to indicate that the segment I is connected to point I, segment 1 is connected to point 1, and so on.

In accordance with the characteristic of the motor-generator in accordance with the present invention, a section of the motor winding and a neighboring section of the generator winding, such as the motor section $11'$ and the generator section $11''$ of FIG. 5, are not superposed directly on each other but are spaced apart in such a manner that their respective radial planes of symmetry, which also define the respective boundaries of these sections, form an angle $\alpha=\pi/N_s$. Since $N_s$ sections are distributed over the periphery of the rotor, that is, over an angle of $2\pi$ for each winding, this angle $\alpha$ represents one-half of the angle between the planes of symmetry of two adjacent sections of the same winding. In the case of FIG. 5, $\alpha$ is equal to $\pi/9$ or 20°.

As shown in FIG. 5, the adjacent sections of one of the windings, such as $11''$, $11'''$ of the generator winding, are thus arranged symmetrically with respect to the neighboring section $11'$ of the other, or motor, winding. Therefore, if at the time of commutation the motor coil $11'$ is in the magnetic field produced by the stationary magnetic circuit and passes through the neutral line of this field, the strong variation in current which takes place in this coil creates induced voltages in the coils $11''$ and $11'''$. The coils $11''$ and $11'''$ are connected together to the commutator segment 1, which at this time is in contact with a brush (not shown). As a result of the symmetrical arrangement of the coils $11''$ and $11'''$ with respect to the coil $11'$, the partial currents corresponding to these induced voltages compensate for each other and practically no parasitic current appears during commutation.

Figure 6:
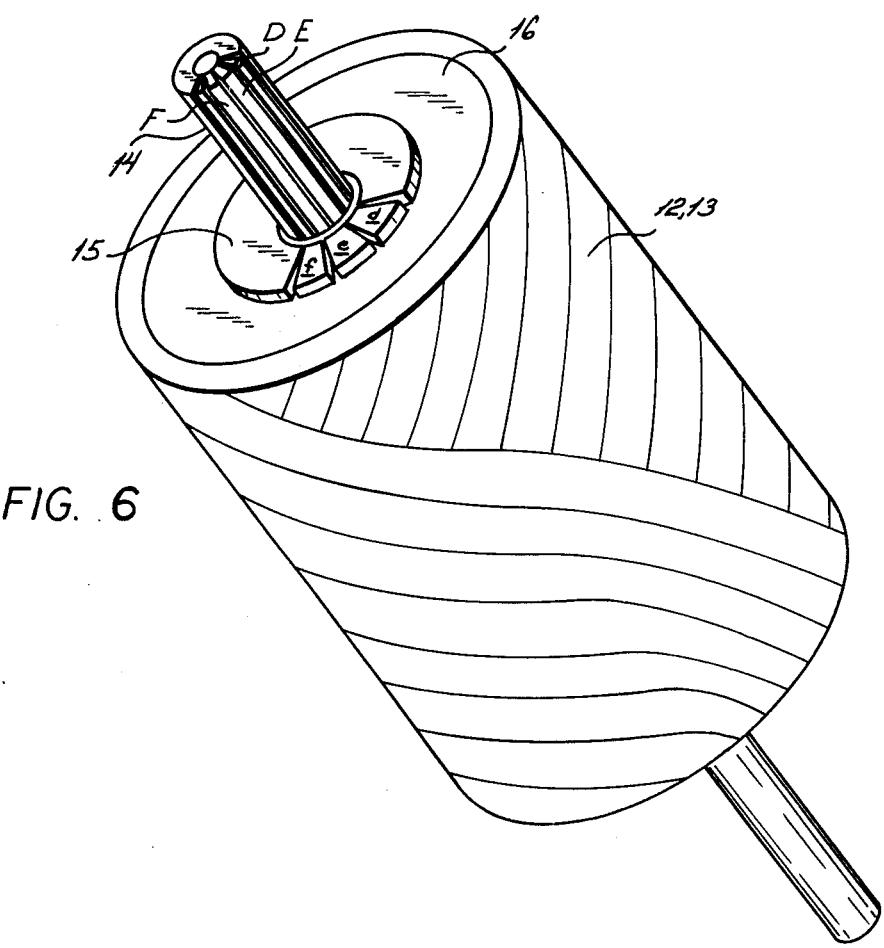
FIG. 6 is a perspective view of a bell-shaped rotor which may be provided with windings arranged in accordance with FIG. 5.

FIG. 6 shows a bell-shaped rotor of a type which can be used with the motor-generator of the present invention. This rotor comprises a self-supporting cylindrical crossed winding, which comprises the two windings, 12 and 13 for instance, in the form of two superposed layers wherein the elementary coils which form the respective sections 11 are arranged in accordance with the principle illustrated in FIG. 5. For this purpose, it is sufficient upon the manufacture of the winding to provide outlet points in the continuous assembly of the turns forming the windings so that the sections thus defined are shifted apart as shown in FIG. 5. The windings 12, 13 are borne in known manner by a sideplate 16 and the communicators 14 and 15 are formed as shown. The laminations of the cylindrical commutator 14 and the segments of the disc-shaped commutator 15 are designated by the same letters in FIG. 6 as used in FIG. 5. The above-described spacing apart of the sections of the windings for the motor-generator can be used in any other form of rotor and/or winding, particularly in the case of multiple-layer windings or disk-shaped rotors, as desired.

While the invention has been particulary shown and described with reference to a specific embodiment thereof, it will be obvious to those skilled in the art that various changes and modifications in form and details may be made without departing from the spirit and scope of the invention. It is, therefore, intended that the appended claims be interpreted as including all such changes and modifications.

What is claimed is:

1. In an electric rotating machine having a stationary magnetic circuit and a rotor bearing at least one winding, said winding comprising a plurality of sections connected in series, each said section being formed of at least two series-connected coil elements; means for connecting the opposite ends of a section to adjacent segments of a commutator associated with said winding; the winding sections being arranged on the rotor such that at least one of said coil elements of one section and at least one of said coil elements of a different section are rotated to be disposed concurrently in the commutation zone so that currents flow through the respective coil elements of said different sections in opposite directions.

2. The electric rotating machine according to claim 1 wherein said sections are arranged in at least two superposed layers on the rotor, and wherein said connecting means comprise connecting points; the arrangement of said coil elements on the rotor and the position of said connecting points are such that at least two superposed coil elements then present in the commutation zone have currents of opposite direction flowing therethrough.

3. The electric rotating machine according to claim 1, wherein said at least one coil element of one section and said at least one coil element of a different section are constituted by adjacent coil elements included in different sections and being arranged side by side.

4. The electric rotating machine according to claim 2, wherein said winding is formed by two superposed layers of coil elements; and said connecting points are disposed between the coil elements of each pair of superposed coil elements, said pair of superposed coil elements being included in adjacent sections, respectively.

5. The electric rotating machine according to claim 2, wherein said winding is formed of three layers of superposed coil elements, all of the coil elements of the same winding section being disposed in a single layer, and wherein adjacent sections partially overlap with each other.

6. The electric rotating machine according to claim 2, wherein said winding is formed by four superposed layers of coil elements, each winding section being comprised of two pairs of superposed coil elements which are spaced apart in the peripheral direction of the rotor.

7. The electric rotating machine according to claim 1, wherein said machine is a motor generator having a motor winding and a generator winding disposed on the same rotor, said motor and generator windings cooperating with said stationary magnetic circuit; and wherein the radial plane of symmetry of a section of the motor winding and the radial plane of symmetry of an adjacent section of the generator winding are spaced apart by an angle $\pi/N_s$, in which $N_s$ is the number of sections of each winding.

8. An electric direct current rotating machine having a stationary magnetic circuit, a rotor having at least one winding thereon and a commutator associated with said winding and comprised of a plurality of commutator segments, said winding comprising a plurality of sections of coil elements, said coil elements in a section being connected in series and said sections being connected in series, at least one coil element of one section being in superposed relation with at least one coil element of an adjacent section; and connecting points located at the opposite ends of each section for connecting said section to adjacent commutator segments, the number of sections of said winding being equal to the number of commutator segments, such that currents of opposite direction flow through the superposed coil elements of adjacent sections when said rotor rotates to dispose said superposed coil elements of said adjacent sections concurrently in the commutation zone.

9. An electric direct current rotating machine in accordance with claim 8 wherein each section is formed of two spaced apart coil elements, one coil element of a section being in superposed relation with one coil element of an adjacent section.

10. An electric direct current rotating machine in accordance with claim 8 wherein each section is formed of three spaced apart coil elements, one coil element of a section being in superposed relation with one coil element of a first adjacent section and with one coil element of a second adjacent section, such that said winding is comprised of three layers of partially overlapping sections.

11. An electric direct current rotating machine in accordance with claim 8 wherein each section is formed of four coil elements arranged in two pairs, each pair being comprised of superposed coil elements and the two pairs being spaced apart from each other, one pair of coil elements of a section being interleaved in superposed relation with one pair of coil elements of an adjacent section and the other pair of coil elements of said section being interleaved in superposed relation with one pair of coil elements of a different adjacent section.

* * * * *